United States Patent [19]
Schreiber et al.

[11] Patent Number: 5,970,491
[45] Date of Patent: Oct. 19, 1999

[54] SYSTEM AND METHOD OF STORAGE MANAGEMENT FOR AN ELECTRONIC MAIL SYSTEM

[75] Inventors: Robert W. Schreiber, Elkton, Md.; Robert S. Miles, Malvern, Pa.

[73] Assignee: International Business Machines Corporation, Armonk, N.Y.

[21] Appl. No.: 08/966,526

[22] Filed: Nov. 10, 1997

[51] Int. Cl.⁶ .................................................. G06F 17/30
[52] U.S. Cl. ............................................ 707/10; 707/106
[58] Field of Search ....................................... 707/10, 206

[56] References Cited

U.S. PATENT DOCUMENTS

| | | | |
|---|---|---|---|
| 4,918,588 | 4/1990 | Barrett et al. | 707/10 |
| 5,303,361 | 4/1994 | Colwell et al. | 707/4 |
| 5,377,354 | 12/1994 | Scannell et al. | 395/673 |
| 5,410,688 | 4/1995 | Williams et al. | 395/600 |
| 5,467,472 | 11/1995 | Williams et al. | 707/1 |
| 5,473,680 | 12/1995 | Porter | 379/201 |
| 5,475,833 | 12/1995 | Dauerer et al. | 707/201 |
| 5,528,739 | 6/1996 | Lucas et al. | 707/526 |
| 5,530,853 | 6/1996 | Schell et al. | 395/600 |
| 5,530,855 | 6/1996 | Satoh et al. | 707/201 |
| 5,544,360 | 8/1996 | Lewak et al. | 707/1 |
| 5,548,753 | 8/1996 | Linstead et al. | 707/1 |
| 5,550,976 | 8/1996 | Henderson et al. | 707/10 |
| 5,553,281 | 9/1996 | Brown et al. | 707/104 |
| 5,623,651 | 4/1997 | Jernigan, IV | 707/206 |
| 5,764,972 | 6/1998 | Crouse et al. | 707/1 |
| 5,845,282 | 12/1998 | Alley et al. | 707/10 |

*Primary Examiner*—Paul R. Lintz
*Assistant Examiner*—Jean Bolte Fleurantin
*Attorney, Agent, or Firm*—Hunton & Williams

[57] ABSTRACT

A system and method of storage management for an electronic mail system are disclosed. The system of storage management for an electronic mail system comprises a distribution management system (112) for receiving information into memory as a distribution and for delivering said distribution from memory to a remote connection; and a container management system (114) for storing and retrieving the distribution from a storage medium. The distribution comprises a plurality of body parts. A method of storage management for an electronic mail system comprises the following steps: (1) receiving information from a first remote connection; (2) writing the information into memory as a distribution, the distribution having at least one object and at least one attribute; (3) storing the distribution to a storage medium as a plurality of files; (4) retrieving at least one of the files from the storage medium; and (5) delivering the distribution to at least a second remote connection.

23 Claims, 14 Drawing Sheets

| OID | ELIMINATIONS | ATTEMPTS | ELIMINATION RATE | WEIGHT |
|---|---|---|---|---|
| NETWORK ADDRESS | 20 | 25 | 8000 | 1 |
| GIVEN NAME | 26 | 50 | 5200 | 1 |
| SURNAME | 20 | 50 | 4000 | 1 |
| ADMD | 12 | 50 | 2400 | 1 |
| COUNTRY | 4 | 40 | 1000 | 1 |
| PRMD | 5 | 50 | 1000 | 1 |
| COMMON NAME | 4 | 50 | 800 | 1 |
| NATIVE NAME | 0 | 0 | 0 | 1 |
| OU4 | 0 | 0 | 0 | 1 |
| DGN | 0 | 0 | 0 | 1 |
| DEN | 0 | 0 | 0 | 1 |
| ORGANIZATION | 0 | 0 | 0 | 1 |
| OU3 | 0 | 0 | 0 | 1 |
| OU2 | 0 | 0 | 0 | 1 |
| OU1 | 0 | 0 | 0 | 1 |
| NUMERIC UID | 0 | 0 | 0 | 1 |
| INITIALS | 0 | 0 | 0 | 1 |
| GENERATION | 0 | 0 | 0 | 1 |
| DDA | 0 | 50 | 0 | 1 |
| TERMINAL ID | 0 | 0 | 0 | 1 |

FIG. 3E

SYSTEM AND METHOD OF STORAGE MANAGEMENT FOR AN ELECTRONIC MAIL SYSTEM

RELATED CASES

This application is related to the following U.S. patent applications: U.S. patent application Ser. No. 08/966,523, entitled "System and Method for Distribution and Storage of Electronic Mail Information," filed Nov. 10, 1997, attorney docket no. 017114.0146; U.S. patent application Ser. No. 08/966,522, entitled "System and Method for Processing Electronic Mail Status Rendezvous," filed Nov. 10, 1997, attorney docket no. 017114.0154; and U.S. patent application Ser. No. 08/966,658, entitled "System and Method for Computer-Aided Heuristic Adaptive Attribute Matching," filed Nov. 10, 1997, attorney docket no. 017114.0166.

TECHNICAL FIELD OF THE INVENTION

This invention relates generally to the field of information processing and more particularly to a system and method of storage management for an electronic mail system.

BACKGROUND OF THE INVENTION

Over the past few years, there has been an explosive increase in the use of the Internet for communication, data transfer, research and recreation. As usage increases, the types of user activities become more varied. Businesses, educational institutions, individuals, and governments are beginning to use the Internet for everything from personal communication to mission-critical commercial negotiations and transactions. Indeed, electronic mail (e-mail) is developing into a preferred alternative to the telephone, conventional paper mail service and facsimile transmission as a means to communicate.

One of the conveniences that electronic mail provides is the ability to distribute an electronic message to a group of recipients simply by adding destination addresses. It is not necessary for a user to print out and mail copies of the same letter to multiple parties, or to transmit the same letter by facsimile to multiple parties. Further, a user can define distribution groups of multiple recipients and simply enter the group name to send an electronic message to all group members. The savings in time, resources, and money makes this an efficient and effective way to transmit messages to multiple recipients.

As more and more users join the electronic messaging community, difficulties arise in the transfer of messages within and among the various e-mail protocols. There are several e-mail protocols in operation today, including SNADS, SNAPI, PROFS, X.400, and SMTP, all of which operate in different ways. In order to communicate between systems that operate on different protocols, messages must be converted form one protocol to another. During this conversion, the originator and recipient information may be mutated or lost. Converted messages may never reach their intended recipients. Moreover, when messages cross protocols, message tracking and status monitoring becomes even more difficult as information originally included with the message may no longer exist.

Accurate electronic mail status reporting may be a critical feature for e-mail subscribers. This feedback may be provided in the form of a return status message, which will normally be generated in two situations. In the first situation, called positive status, a message indicating a successful delivery is sent to the originator upon delivery to or receipt by the intended recipient. This is typically only done at the request of the originator. It is analogous to requesting a return receipt from the post office for conventional mail delivery. The second situation, called negative status, occurs when a message is not successfully delivered to one or more intended recipients for a myriad of reasons. The originator is typically provided with the original message and a reason why the message was not successfully delivered. Negative status is typically automatic regardless of whether the originator has requested feedback.

Problems in providing feedback to the originator across different e-mail systems occurs due to the potential mutation and/or truncation of originator and recipient information, typically by external gateways. In most situations the originator information is not affected, resulting in a return status being delivered to the originator with no clear indication of whom the intended recipient for the message was.

Existing systems have other shortcomings. For example, many message storage facilities maintain the message data in shared memory. The use of shared memory inherently creates capacity problems. Such systems are also inefficient because they often store and manage redundant information. Moreover, due to the ability of a plurality of sharing processes to access the information, the integrity of the shared data is at risk.

Depending on the particular hardware architecture, the amount of shared memory is typically limited to a theoretical maximum of 2048 megabytes. With the observed growth in e-mail traffic, this would provide a maximum capacity of approximately 5,000 to 20,000 documents, depending on document sizes.

Many electronic messaging systems today use fourth generation databases to store distributions. This is inherently too slow and inefficient for the demands of high volume messaging switches.

Another shortcoming of using shared memory for the storage of e-mail is the relatively high expense and low capacity of RAM memory versus that of disk storage.

Another shortcoming of using shared memory is that unless expensive battery-backed-up static RAM is used, the data will be lost in the event of a power failure. Hard disk technology does not have this limitation, as information stored on hard disk is no longer volatile.

To meet the demands of modern electronic messaging, there is a need for a system and method that efficiently stores, tracks, manages, monitors, and transfers e-mail across a plurality of protocols.

SUMMARY OF THE INVENTION

A system and method of storage management for an electronic mail system are disclosed. The system of storage management for an electronic mail system comprises a distribution management system for receiving information into memory as a distribution and for delivering said distribution from memory to a remote connection; and a container management system for storing and retrieving the distribution from a storage medium. The distribution comprises a plurality of body parts.

A method of storage management for an electronic mail system comprises the following steps: (1) receiving information from a first remote connection; (2) writing the information into memory as a distribution, the distribution having at least one object and at least one attribute; (3) storing the distribution to a storage medium as a plurality of files; (4) retrieving at least one of the files from the storage medium; and (5) delivering the distribution to at least a second remote connection.

A technical advantage of the present invention is that a storage management method is provided. Another technical advantage is that the invention provides read-only storage of distribution body parts to disk. Another technical advantage is that the distribution is stored as a double-linked, parent-linked list using relative file offsets, which make it immediately usable without transformation. Another technical advantage is that the SUBAVL files have pointers into the DSTAVL files. Another technical advantage is that re-write operations are restricted to the SUBAVL files, which are typically very small.

BRIEF DESCRIPTION OF THE DRAWINGS

For a more complete understanding of the present invention, the objects and advantages thereof, reference is now made to the following descriptions taken in connection with the accompanying drawings in which:

FIG. 3e is an example of a search list table according to one embodiment of the present invention.

DETAILED DESCRIPTION OF THE INVENTION

The preferred embodiment of the present invention and its advantages are best understood by referring to FIGS. 1 through 5 of the drawings, like numerals being used for like and corresponding parts of the various drawings.

In order to facilitate understanding the teachings of the embodiments of the present invention, it will be helpful to know the terminology used. "Originator" is used to describe the party creating an electronic message. The term "intended recipient" is used to describe a party intended to receive an electronic message from the originator. The term "reported recipient" is used to describe an intended recipient for which status is being returned.

There are also terms used to describe the electronic message and its contents. For instance, an Object Identifier (OID) is an attribute describing the intended recipient or the originator. Examples of attributes are network address, given name, surname, country, common name, organization, originator's mailbox and subscriber information, security information, etc. There are approximately 2700 attributes that may be used.

The term "Body part" is used to refer to a part of an e-mail message, such as the message or an attachment.

Throughout this description, n is used to represent an undetermined number. It should be noted that n, when used with more than one item, does not indicate the same limitations on each item, but that each item has an undetermined upper limit.

Figure 1:
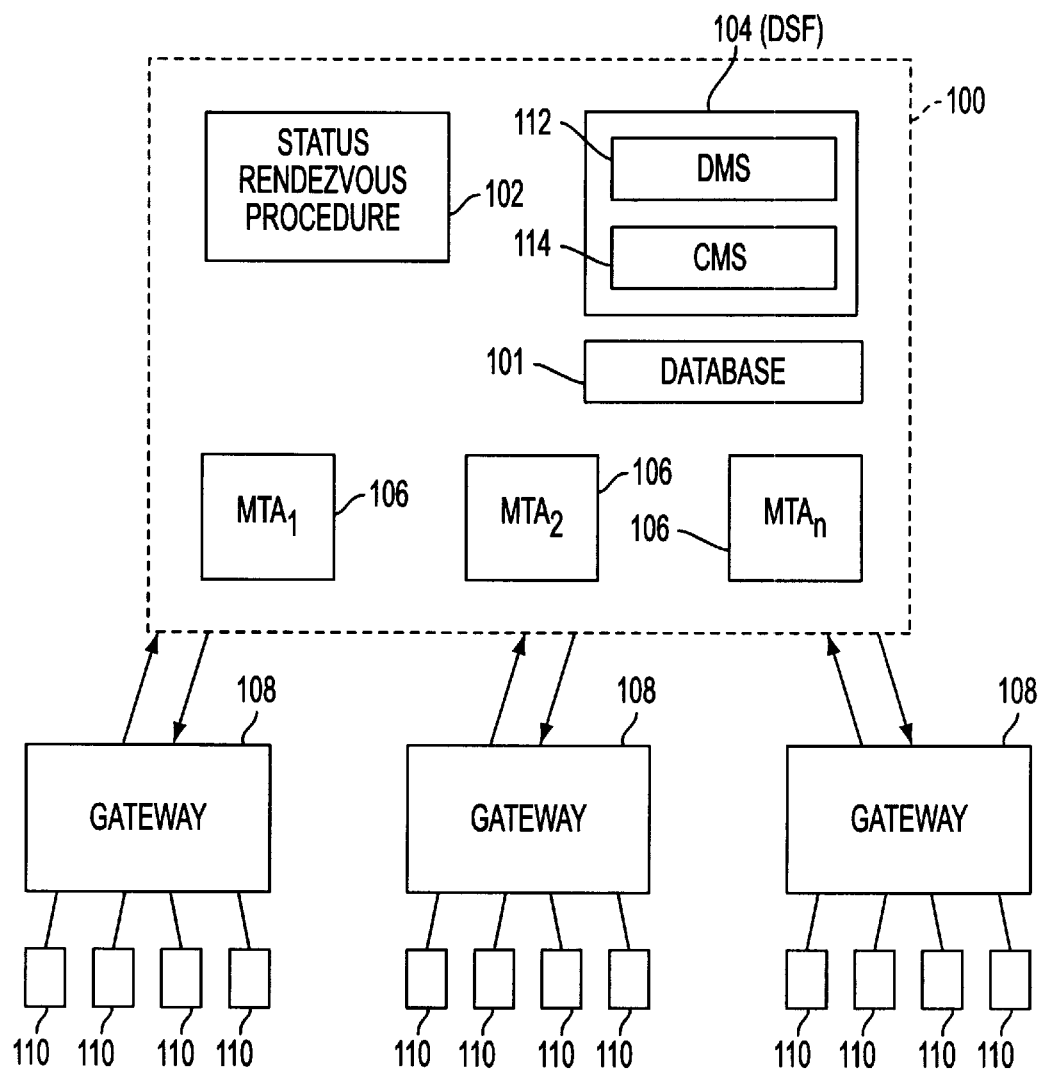
FIG. 1 illustrates an overview of a messaging system in accordance with the present invention.

Now referring to FIG. 1, which illustrates an overview of a messaging system in accordance with the present invention, mail switch 100 is provided. In one embodiment, mail switch 100 is the Lotus Messaging Switch (LMS), which is a software application running on a server, and is manufactured by Lotus Development Corporation. Other types of mail switches may also be used. Mail switch 100 may be further connected to token rings and/or ethernet, or any other networking.

Mail switch 100 may comprise, inter alia, Database 101, Status Rendezvous Procedure 102 and Distributed Storage Facility (DSF) 104. In one embodiment, Database 101 is managed with the Oracle Database Management System, manufactured by Oracle Corporation of Redwood Shores, Calif. Other elements may be provided as necessary.

A plurality of Message Transfer Agents (MTA) $106_1$–$106_n$ are co-located with mail switch 100. MTAs 106 are software modules and are part of mail switch 100. One MTA 106 may be provided for each messaging system or protocol, such as for Lotus Notes, Lotus cc:Mail, PROFS, DISOSS, Microsoft Mail, DEC All-in-1, SMTP, X.400, etc. MTAs 106 connect a plurality of gateways 108 to message switch 100. Gateways 108 are software elements running on remote servers, and are well-known in the art. In one embodiment, one MTA 106 exists for each gateway 108. In another embodiment, one MTA 106 may serve more than one gateway 108, provided that the gateways 108 all use the same messaging system (i.e., all are Lotus cc:Mail).

A plurality of User agents (UAs) 110 are connected to gateways 108. These may be connected in a network configuration, such as in a local area network. Other organizations may also be used. UAs 110 may be personal computers, or they may be "dumb" terminals.

DSF 104 comprises the Distribution Management Service (DMS) 112 and the Container Management Service (CMS) 114. DMS 112 provides a logical infrastructure for the creating and manipulation of distributions, while CMS 114 provides the interfaces for the conversion of a logical representation to a physical representation on a disk or other medium, and vice-versa.

DMS 112 has at least three main functions. One function is running the Status Rendezvous Procedure 102. Another function is processing inbound information. Still another function is processing outbound information. These functions will be discussed in detail below.

Figure 2:
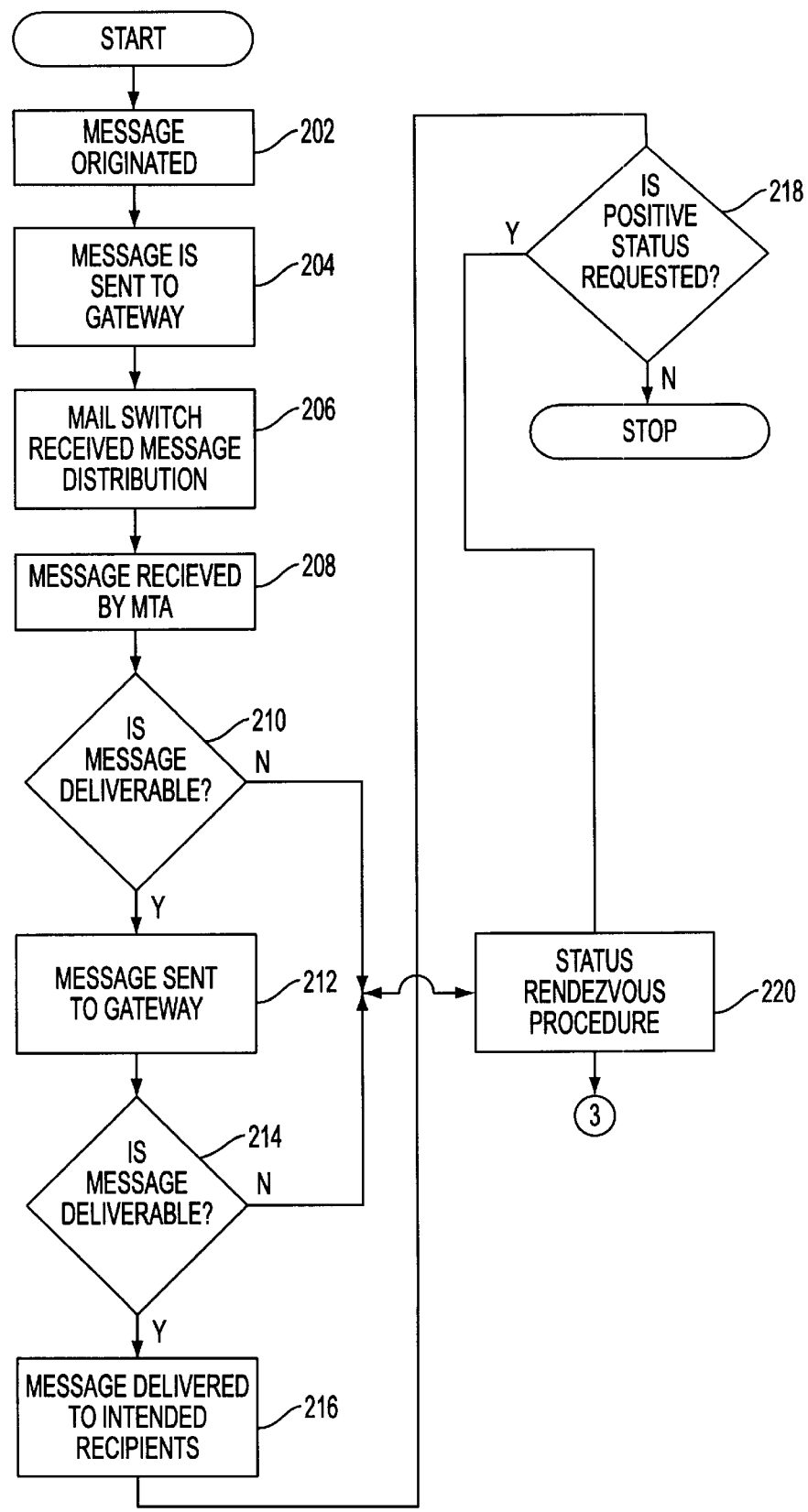
FIG. 2 illustrates a flowchart of the return status function according to one embodiment of the present invention.

One function is running the Status Return Procedure 102. Referring to FIG. 2, which illustrates a flowchart of the Status Rendezvous Procedure 102 according to one embodiment of the present invention, in step 202 UA 110 originates a message. This message may comprise, inter alia, attachments, such as documents, spreadsheets, executable programs, voice, video, etc. The message may also have more than one intended recipient. Once the message is ready to be sent, in step 204, UA 110 sends the message to all of the intended recipients in the form of a distribution message to gateway 108. Prior to forwarding the message to MTA 106, gateway 108 may perform "editing" of the message, and may delete and/or modify originator or recipient information embedded in or attached to the message. MTA 106 receives the message and converts the format of the message to a canonical format that is used by mail switch 100.

In step 206, mail switch 100 receives the distribution message. DSF 104 performs operations on the message, which will be discussed later, and forwards the message to MTAs 106 that serve the intended recipients.

In step 208, the individual message is received by MTAs 106. MTAs 106 convert the message to the format used by the gateway mail systems, and then forward the message to gateways 108. Gateway 108 receives the message and may perform additional "edits" of the message, including the possible deletion or modification of originator and recipient attributes.

In step 210, MTA 106 determines whether or not the message can be delivered to gateway 108. A failure to deliver may occur if gateway 108 is "down" for an extended period of time, or for various other reasons. When the message cannot be sent to gateway 108, MTA 106 creates a return status message to the originator in step 220.

If the message can be delivered to gateway 108, it is delivered in step 212. Gateway 108, in step 214, determines whether or not the destination address for the intended recipient is valid. There are many reasons why the destination address will not be valid, such as if the intended recipient no longer works for a certain employer, the intended recipient address does not exist, etc. If the destination address is valid, in step 216 the destination MTA 106 forwards the individual message to the intended recipient at the destination address.

If the destination address for intended recipient 110 is not valid, or if in step 218 it is determined that positive confirmation was requested by the originator, a return status message is created in step 220. This may include, inter alia, the original distribution identification (distId) number (a ten digit number assigned to every piece of electronic mail), as well as some of the body parts of message as originally sent.

As discussed above, it is not uncommon for the original message to be included in the return status message with some of the information edited and/or missing. This returned message may include some, but not all, of the attributes included by the originator, making it difficult to determine the intended recipient. For example, the originator may have intended the message for "John Smith," using both the attributes given name and surname, but when the message was returned, all that was included was the given name "John." This is more of a problem if, in the same distribution, the message was also sent to "John Doe."

In order to determine the intended recipient, mail switch 100 has Status Rendezvous Procedure 102 locate the distId and then locate the original distribution for this distId. Status Rendezvous Procedure 102 then applies an algorithm, which will be discussed next, to determine the intended recipient of the message.

Figure 3A:
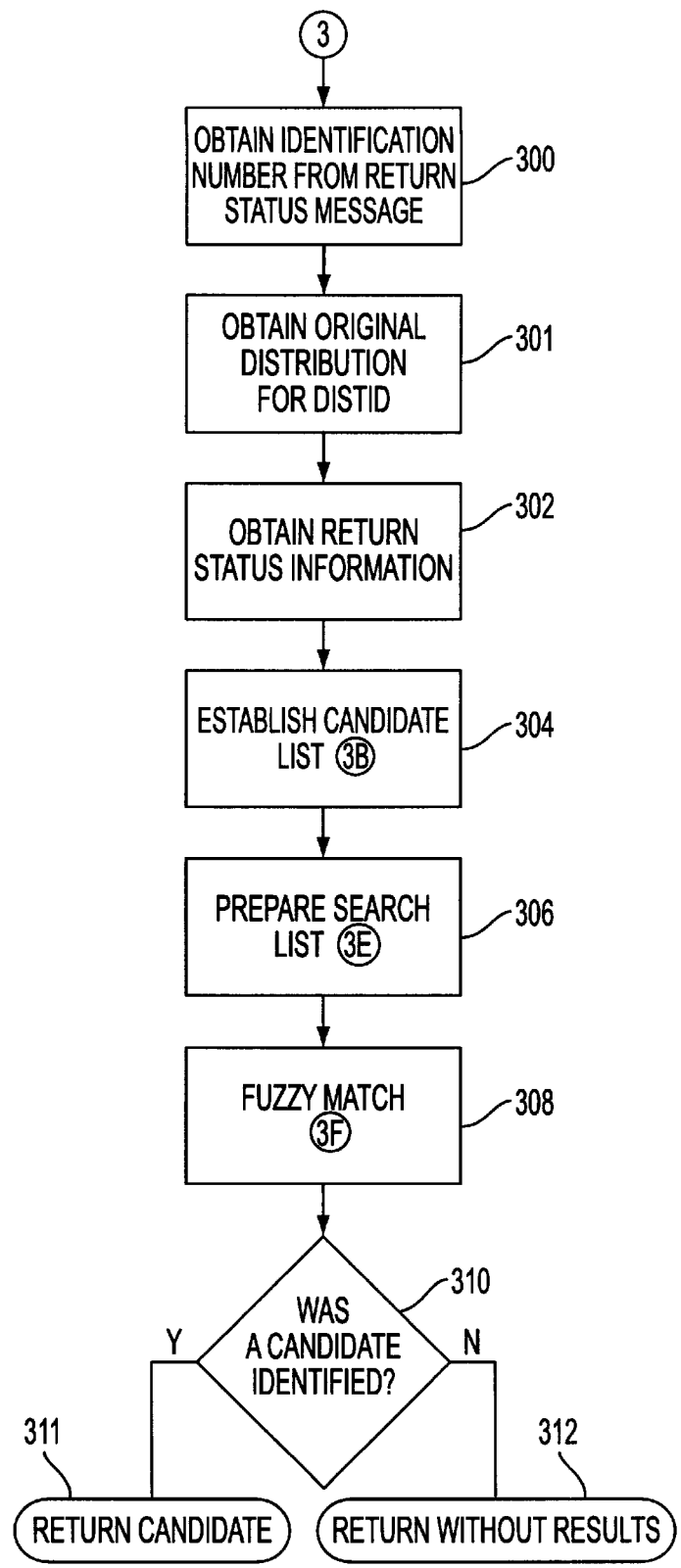
FIG. 3a illustrates a flowchart of the return status algorithm according to one embodiment of the present invention.

Referring to FIG. 3a, which illustrates a flowchart of the return status algorithm according to one embodiment of the present invention, in step 300, the algorithm first determines the original distId from the return status message. In step 301, the algorithm retrieves the distribution that was associated with that distId number. This will typically include a number of intended recipients, but it may include only one intended recipient. In step 302, the algorithm obtains information from the return status message, such as the OIDs that can be extracted that describe the reported recipient in the returned status message. In step 304, the algorithm establishes a candidate list. This is created using the original distribution retrieved in step 301.

Figure 3B:
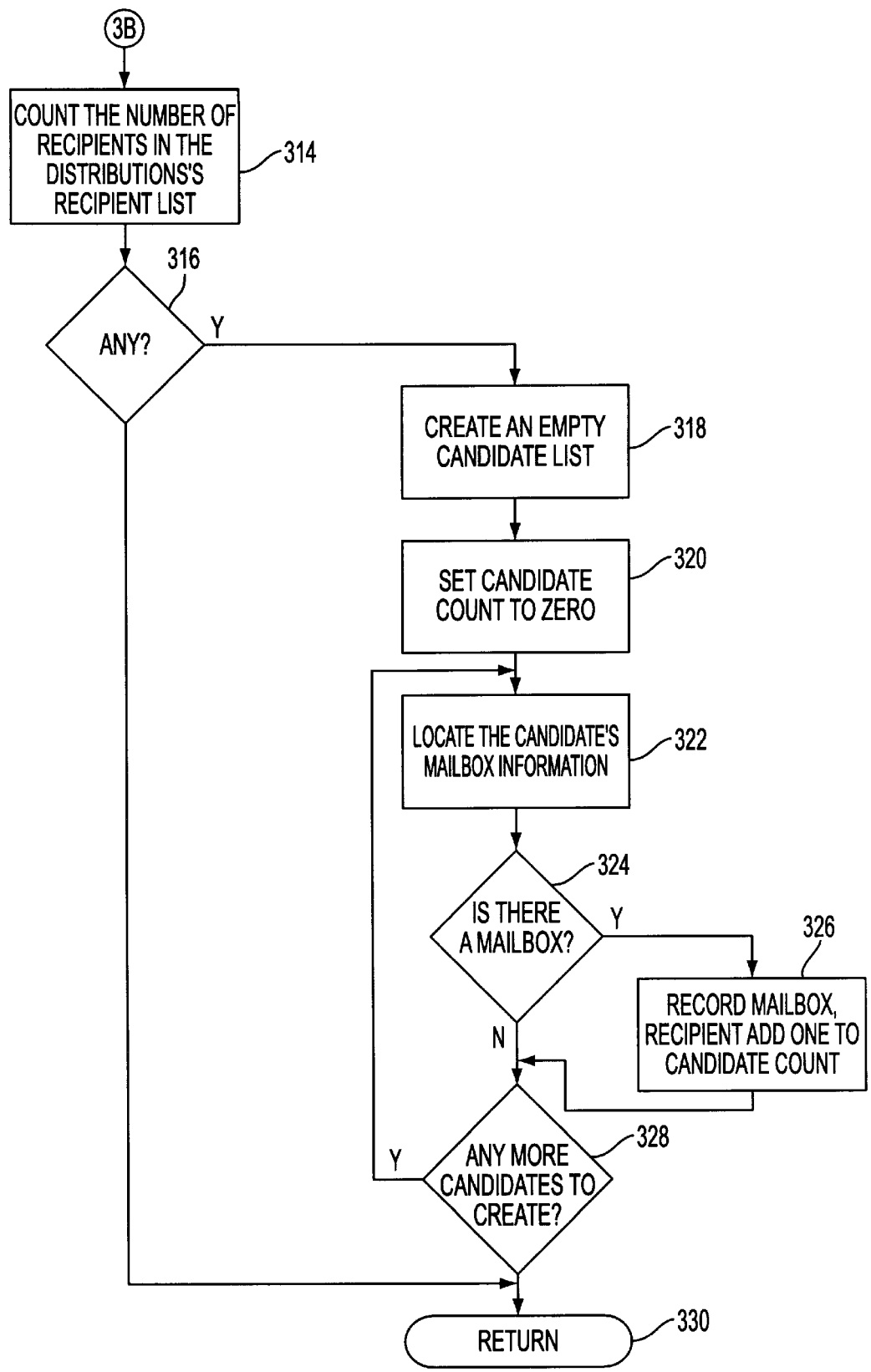
FIG. 3b illustrates a flowchart of the initialize candidate list routine according to one embodiment of the present invention.
Figure 3C:
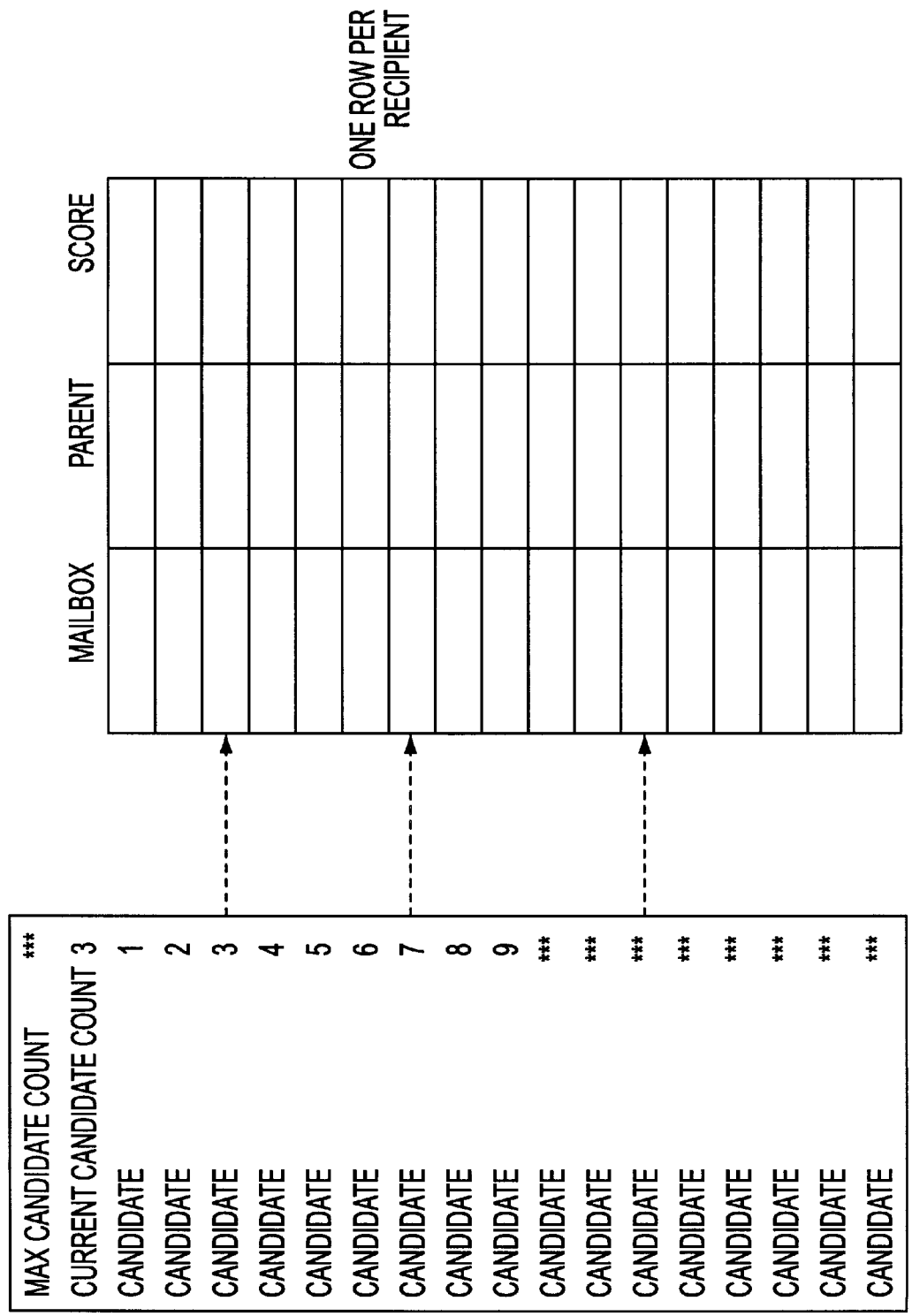
FIG. 3c is an example of an empty candidate table according to one embodiment of the present invention.

Referring to FIG. 3b, in step 314 the number of recipients in the Distribution's Recipient list are counted. If, in step 316, there are no recipients in the list, the algorithm returns to FIG. 3a in step 330. If, in step 316, there are recipients in the list, the algorithm in step 318 creates an empty candidate list. An example of an empty candidate list is given in FIG. 3c. In a candidate list, n candidates exist, and each candidate has a field for mailbox, parent, and score. Referring to both FIGS. 3b and c, in step 320, the candidate count is set to zero. Next, in step 322, the Candidate's mailbox information is located, and in step 324, a determination as to whether or not a mailbox for the candidate exists is made. If a mailbox exists, in step 324, the mailbox and the recipient information are recorded and the candidate count is increased by one. If mailbox information does not exist, the algorithm determines if there are any candidates that may be created. If there are, the process loops back to step 322. If there are not, the algorithm returns in step 330.

Figure 3D:
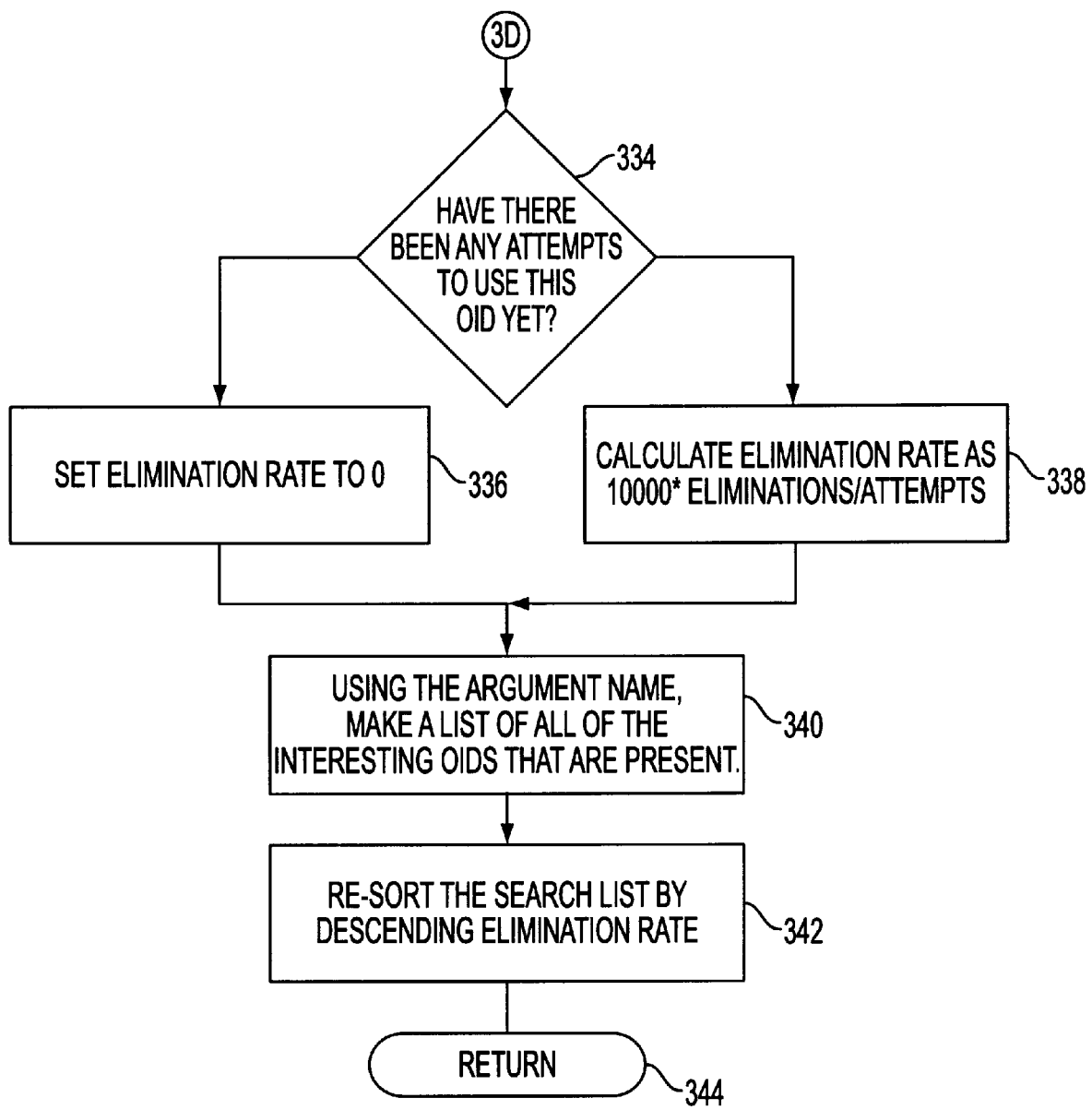
FIG. 3d illustrates a flowchart of the prepare search list routine according to one embodiment of the present invention.

Referring again to FIG. 3a, the algorithm next prepares a search list in step 306. Referring to FIG. 3d, in step 334, a determination as to whether there have been any attempts to use the OID have been made. If there have not been any attempts, in step 336, the elimination rate is set to zero. If there have been attempts, the elimination rate is calculated in step 328. The elimination rate is calculated as 10000*eliminations/attempts. Next, in step 340, the algorithm makes a list of all the interesting OIDs that are present. In step 342, the list is re-sorted by descending elimination rate. An example of the result of these steps is shown in FIG. 3e. In this figure, the interesting OIDs are shown in the left-hand column. Next, a column for eliminations is shown, followed by attempts and by the elimination rate. A column is provided for the weight of each OID. This weight may be set to any number, and may differ for each OID. For instance, the OID "Network Address" may be given a greater weight than the OID "Country," which may aid in distinguishing candidates.

The search list is not reset with each attempt at locating a reported recipient. Instead, mail switch 100 maintains copies of the search list and continuously updates the list. With each successive attempt, the "best" OIDs having the highest elimination rate rise to the top of the search list and are used first. The result of this is a system that learns which attributes are most likely to eliminate candidates and quickly and efficiently determines the identity of the reported recipient.

Figure 3F:
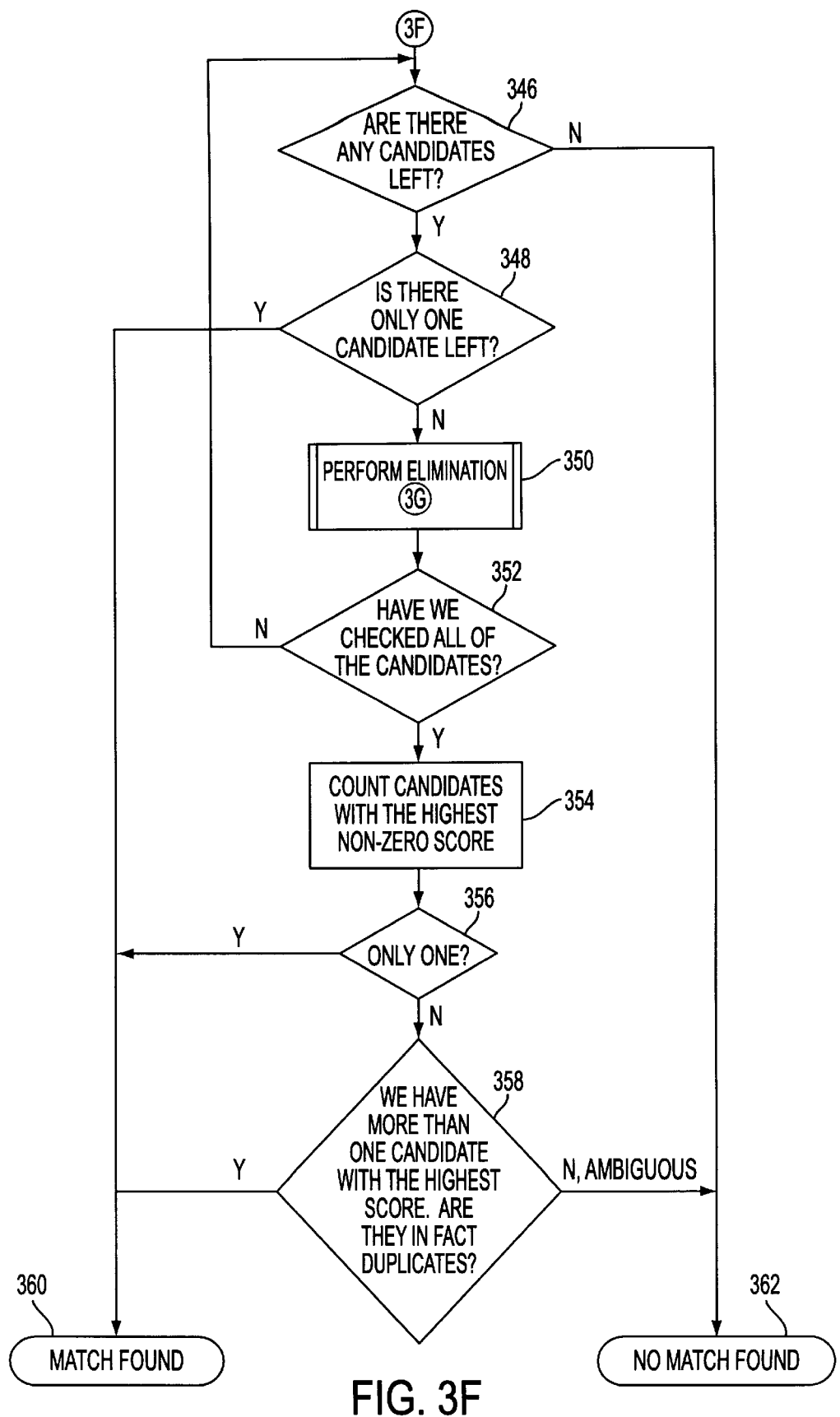
FIG. 3f illustrates a flowchart of the fuzzy match routine according to one embodiment of the present invention.

Referring again to FIG. 3a, the algorithm next performs a fuzzy match in step 308. Referring now to FIG. 3f, in step 346, a determination is made as to whether or not there are any candidates left. If there are candidates remaining, in step 348, a determination is made as to whether only one candidate remains. If there is only one candidate, a match has been found and it is returned in step 360. If there is more than one candidate remaining, further elimination is performed in step 350.

Figure 3G:
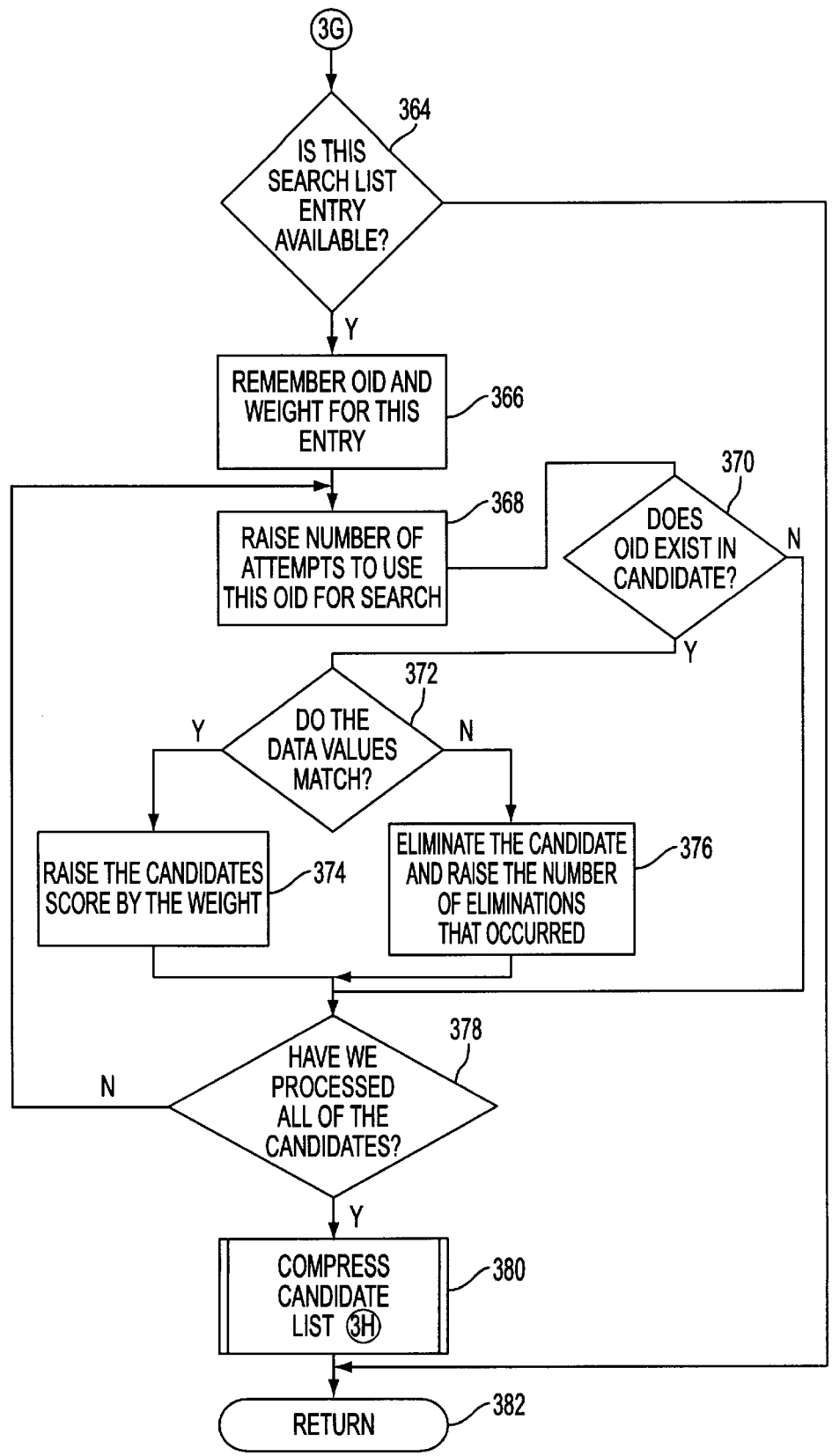
FIG. 3g illustrates the perform elimination routine according to one embodiment of the present invention.

Referring to FIG. 3g, in step 364 a determination is made as to whether or not this search list entry is available. If it is, in step 366, the algorithm remembers the OID and the weight for this entry. Next, in step 368, the number of attempts to use this OID is increased. In step 370, a determination is made as to whether this OID exists for this candidate. If it does not, the algorithm does nothing to the candidate, and proceeds to step 378. If the OID does exist, in step 372, a determination is made as to whether or not the data values match. If they do, the candidate's score is increased by the weight for the OID in step 374. If they do not, the candidate is eliminated and the number of eliminations is increased in step 376. In step 378, a determination is made as to whether or not all candidates have been processed. If they have been, in step 380, the candidate list is compressed.

Figure 3H:
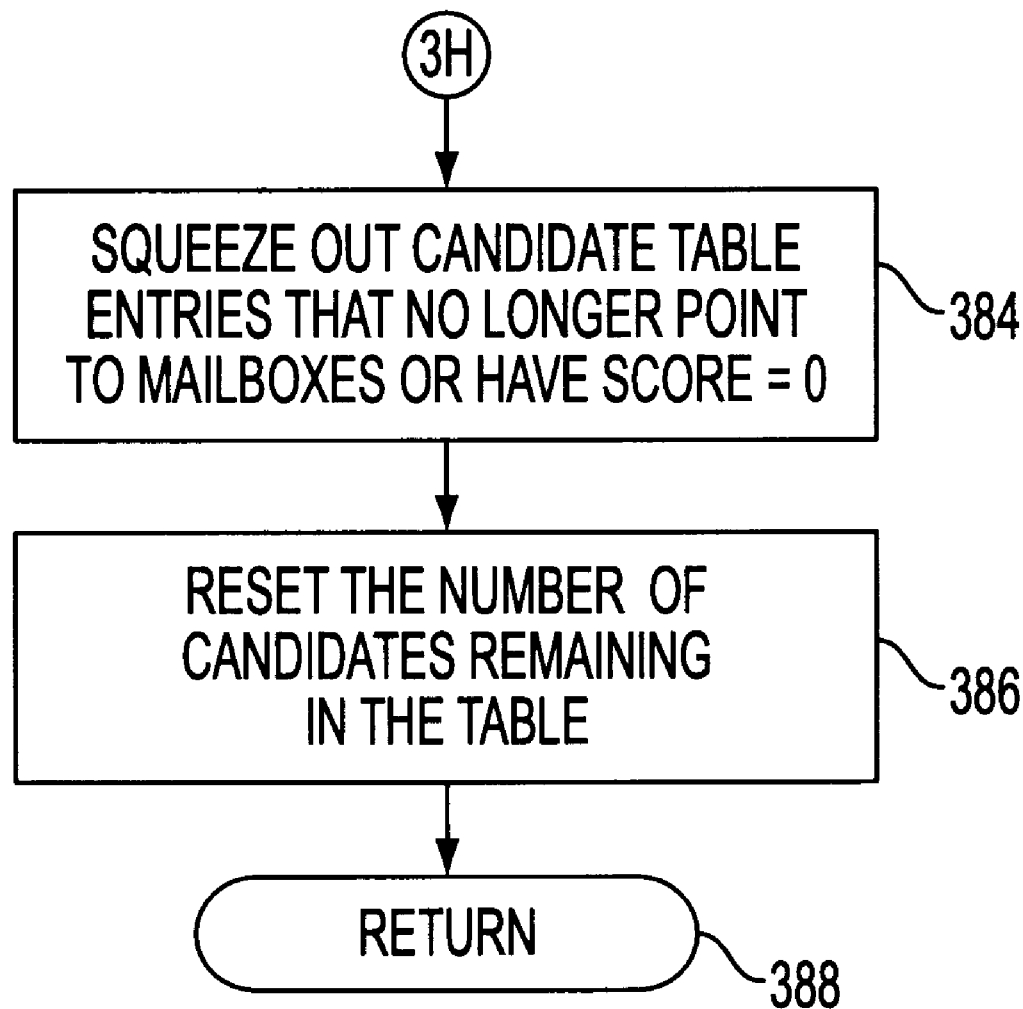
FIG. 3h illustrates the compress candidate routine according to one embodiment of the present invention.

Referring to FIG. 3h, the candidate compression procedure is shown. In step 384, the candidate table entries that no longer point to mailboxes or that have scores equal to zero are eliminated. Next, in step 386, the number of candidates remaining in the table is reset. In step 388, the procedure returns.

Referring again to FIG. 3g, once the candidate list has been compressed, or if the search list entry is unavailable in step 364, the procedure returns. Referring to FIG. 3f, a determination is made as to whether or not all candidates have been checked in step 352. If they have not, the process loops to step 346. If they have, in step 354, the process counts the number of candidates with the highest non-zero score. If, in step 356, there is only one candidate with the highest score, a match is found and is returned in step 360.

If there are more than one candidate with the highest non-zero score, in step 358 a determination is made whether these candidates are in fact the same. If they are, a match has been found and is returned in step 360. If no determination can be made, these candidates are considered to be different and, accordingly, no match is found.

In another embodiment of the present invention, it may be desirable to return a plurality of candidates that have the highest non-zero score. This may permit the originator to send the distribution to those returned candidates again, or it may permit the originator to contact the returned candidates individually or by another means to further determine the intended recipient. In another embodiment, a message may be sent indicating that the reported recipient is unknown.

Referring again to FIG. 3a, in step 310, a determination is made as to whether or not a candidate was identified. If a candidate was identified, in step 311, this is returned. If there was not, in step 312, no results are returned.

Once the candidate is identified as the reported recipient, this information, along with any other information is forwarded to the originator. In one embodiment, a description of the reason that the message could not be delivered to the reported recipient is included. Other information may be included as necessary and appropriate.

If positive status was desired, the originator may be provided with a message that indicates that the message was delivered or received by the intended recipient. Other information, such as the date and time of delivery, may also be included in this message.

Figure 4A:
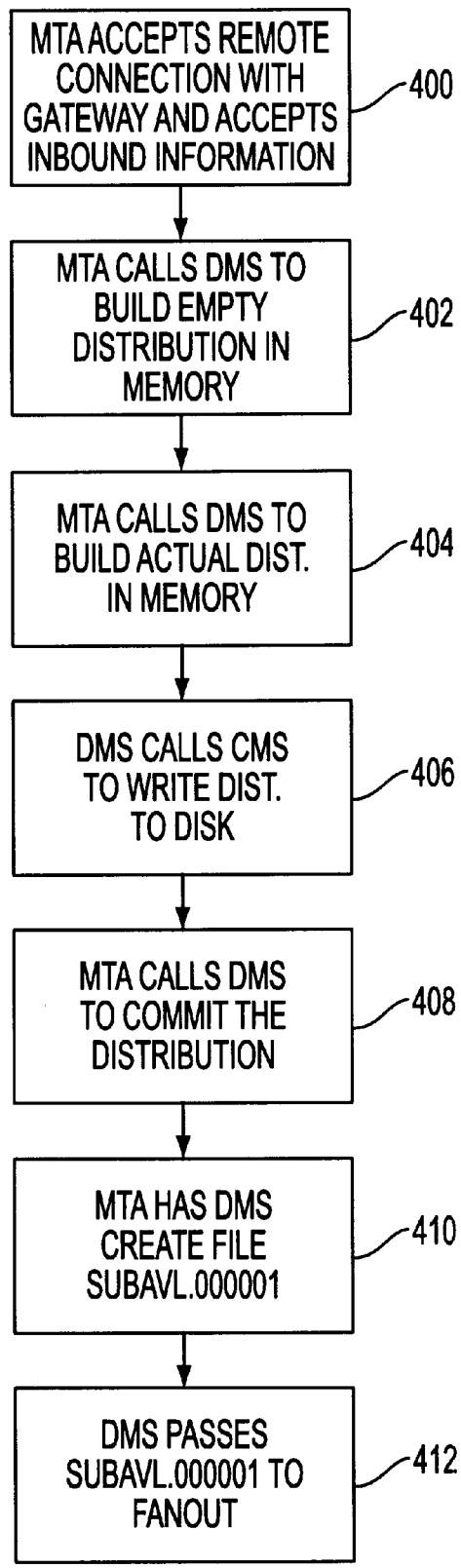
FIG. 4a is a flowchart illustrating the DMS processing of inbound information according to one embodiment of the invention.

As discussed above, DMS 112 is also responsible for the processing of inbound information. Referring to FIG. 4a, which is a flowchart of the inbound processing performed by DMS 112 in accordance with one embodiment of the invention, in step 400 one of the MTAs 106 accepts a remote connection with a gateway 108 and accepts inbound information. In step 402, MTA 106 calls DMS 112 to build an empty distribution in memory. In step 404, MTA repeatedly calls DMS 112 to build the actual distribution in memory. This includes building the originator, envelope, recipients, and content components. At the completion of step 404, the distribution has been built and resides in memory.

Figure 5:
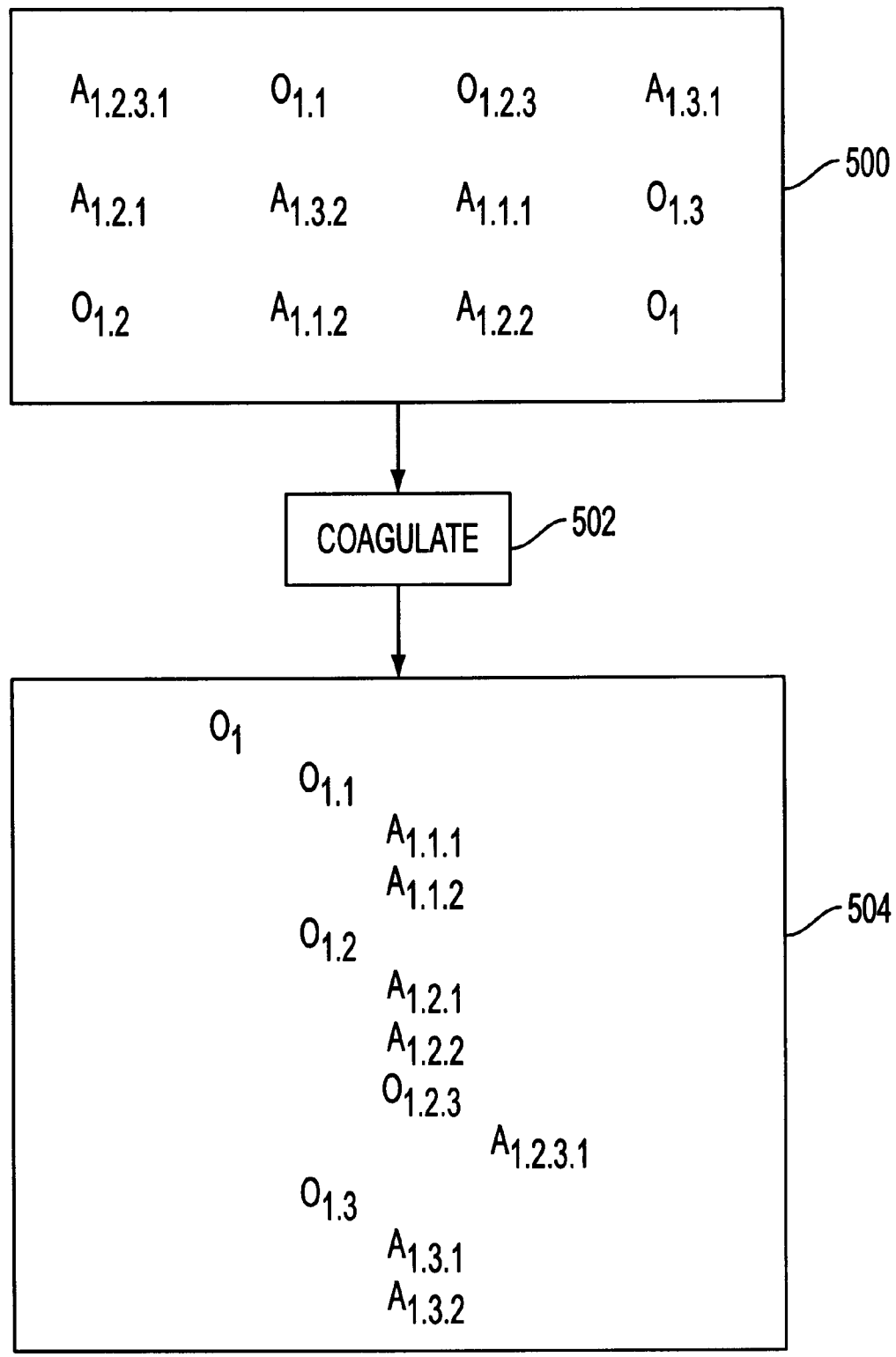
FIG. 5 illustrates an example of the DMS inbound processing according to one embodiment of the invention.

An example of this is shown in FIG. 5. In this figure, the objects (O) and attributes (A) for a particular distribution are randomly distributed in memory 500. Objects may comprise multiple objects and/or attributes that may be addressed via a relative offset that may be used to locate the prior, next, or parent object or attribute. Objects typically do not have an assigned value. Examples of objects are distribution, originator, original name, recipient list, envelope information. Attributes, on the other hand, have specific values and do not contain any other objects or attributes. For example, the object originator would not have a value, but would include attributes having values such as common name, mailbox name, etc.

Objects and attributes are related by a hierarchial structure. An example of this structure is shown in file 504. An advantage of this structure is that if the address of any object or attribute in the structure is known, any other object or attribute can be located using the relative offsets. For example, if the address of $A_{1.2.3}$ is known, the parent offset may be used to navigate to the top of the structure $O_1$ and then the next offset may be used to navigate to desired attribute $A_{1.2.2}$.

Any number of objects or attributes may be provided. This structure is extremely flexible and does not limit the size or number of objects or attributes. Additionally, most objects or attributes are optional.

The random distribution of the objects and attributes in memory 500 is typically the result of step 404. Referring again to FIG. 4a, in step 406, DMS 112 calls CMS 114 to write the distribution in memory to disk.

In order to handle the thousands or hundreds of thousands of distributions received by message switch 100, and to effectively and efficiently store these distributions, a plurality of directory levels may be used. Ten primary directories exist, named 0–9, and each primary directory has ten secondary directories, also named 0–9. Any number of directory desired levels may also be provided. In one embodiment, a total of three levels of directories, establishing a total of 1,110 directories, are provided. In another embodiment, four levels of directories, establishing 11,110 directories, are provided. Any convenient number of directory levels may be selected.

CMS 114 uses digits from the distId in order to determine the directory in which the file will be stored. The number of digits selected from the distId should be the same as the total number of directory levels. For example, if three digits are selected from the distId, a total of three directory levels should exist.

Any digits may be selected from the distId, and the digits may be consecutive or non-consecutive. When selecting which digits to use, digit roll-over should be considered. This takes into account the fact that the digits on the right side of the distId will change more rapidly than those on the left, similar to the way digits in an odometer roll-over. Thus, if digits from the left are selected, there will be minimal dispersion of files amongst directories because the digits, and thus the directories will not change often. However, if digits from the right are selected, every distribution will be stored in a different directory, resulting in significant read/write head travel. It is desirable to minimize read/write head travel whenever possible in order to increase efficiency of the system. However, some read/write head travel is required to accomplish the objective of dispersing files amongst several directories. Therefore, digits should be selected that accommodate both of these considerations. In one embodiment, the seventh, eighth, and ninth digits are selected to accomplish these goals.

Once the digits are selected, a file may be stored with the filename/{$SAFE_STORE}/{$SWITCH_ID}/{digit #1}/{digit #2}/. . . /{digit #n}/{distId}.{file type}.{sequence number (optional)}. For example, for a distId of 0104952897, using the seventh, eight, and ninth digits to select the directories, and having an electronic switch id of 000790, a sample filename that may be generated is: /emxdata/safestore/000790/2/8/9/0104952897.xxxxxx.000001. The file type xxxxxx is used to represent the storage class of the file. Various storage classes define the dynamics of file creation, checkpointing, and synchronization to the disk. The storage class DSTAVL is used to represent distribution control information. Other file types include PRDATA, SUBAVL, ILDATA, and OLDATA, all of which will be discussed below. Sequence numbers, such as "000001" and "000002" may be used in conjunction with the file type to allow multiple files of the same type to be stored for a single distribution. In one embodiment, a six digit serial number is used in conjunction with the storage class to allow the storage of up to one million body parts. Other types of sequence numbers may be used as desired.

In another embodiment, a temporary storage file system may be provided. In this embodiment, the $TEMP_STORE is used to store SUBAVL files. This file system is implemented as a RAM disk, which is well-known in the art. An advantage that this provides is that no disk I/O for SUBAVL files is required.

A DSTAVL file, short for Distribution Attribute Value List, contains all the information regarding the originator, recipients, reported recipients, copy names, envelope, body parts, and routing information needed to deliver the distribution. DSTAVL files consist of first class objects, which are the primary elements of a distribution, such as originator, distribution_id, envelope, etc. Typically, DSTAVL files are approximately 8 to 12 Kbytes in size, but may be many megabytes when numerous intended recipients, copy names, or body parts exist.

A SUBAVL file describes a deliverable view of the DSTAVL file. An example of the construction of the SUBAVL file is that a SUBAVL file does not contain recipient information, but instead includes a pointer to intended recipient information in the DSTAVL file.

A PRDATA file, also referred to as a permanent data container, is used to store the body parts of the distribution. Typically a plurality of PRDATA files are stored on hard disk in read-only format. For example, for a distribution including twelve spreadsheets, thirteen PRDATA files would be created—one for the message, and one for each attached spreadsheet.

Further, the DSTAVL, PRDATA, ILDATA, and OLDATA files are stored as a read-only files and cannot be edited, promoting the overall reliability of information. SUBAVL FILES, which are modifiable, are destroyed and reconstructed during system restart. This guarantees a clean restart when the system needs to be restarted. System efficiency is also increased because database management system information, such as Oracle, is not required to be loaded before reading the files, since the files are in a hierarchial binary format rather than another format.

Referring to FIG. 5, DMS 112 calls the coagulate procedure 502 to organize the objects and attributes in a linear form for CMS 114 to write to disk. The objects and attributes are written as a double-linked, parent-linked list using relative file offsets rather than absolute pointers. The result of the coagulation and writing is a file organized similar to file 504.

This procedure results in a reduction of free space fragmentation problems because the data are stored in a small number internally self-describing files. Each file contains tightly packed objects and attributes as well as their associated identification and navigation information.

Referring to FIG. 4a, MTA 106 calls DMS 112 to commit the distribution. DMS 112 in turn coagulates the distribution and then calls CMS 114 to write the distribution to disk as a DSTAVL file. Next, in step 410, MTA 106 calls DMS to create a file subavl.000001, or an equivalent file name. This file is essentially a view of the original distribution. It can also refer to translated information as well. In step 412, DMS 112 passes the file subavl.000001 to FANOUT for further processing.

Figure 4B:
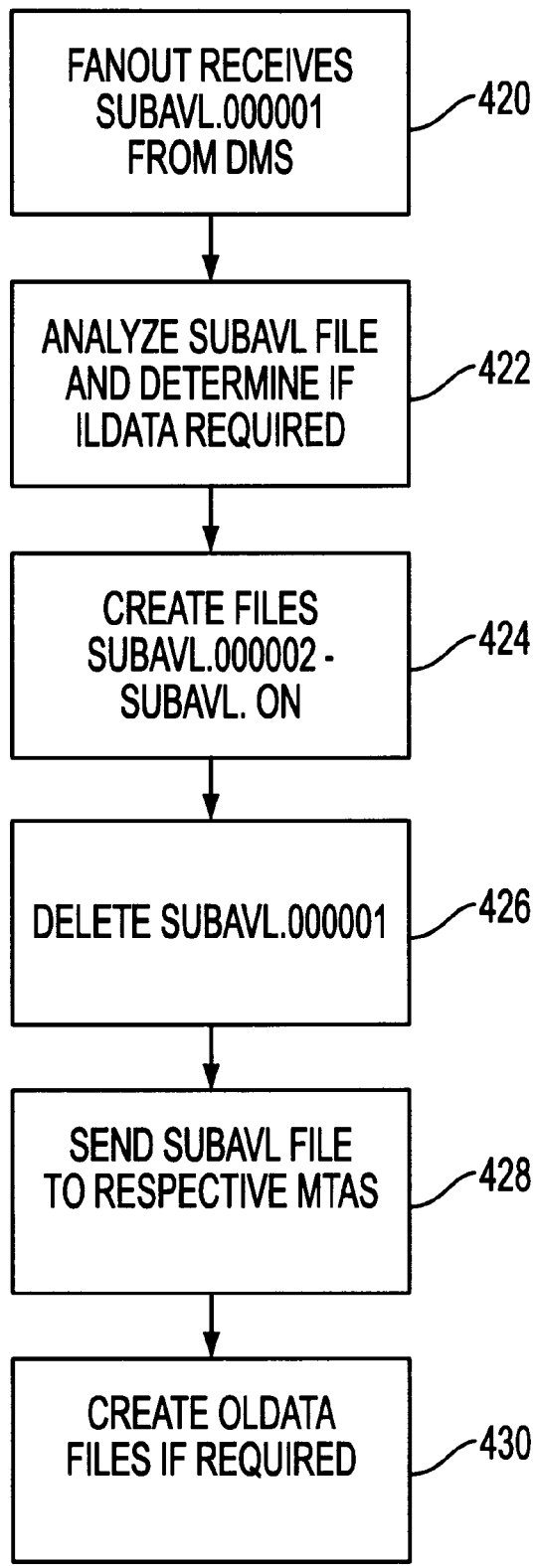
FIG. 4b is a flowchart illustrating the FANOUT procedure.

FANOUT prepares the message for several MTAs 106. Referring to FIG. 4b, an example of the FANOUT process in accordance with one embodiment of the invention is shown. In step 420, FANOUT receives the file subavl.000001 from an inbound MTA 106. FANOUT next analyzes the file in step 422, and determines if it is necessary to create an ILDATA file. An ILDATA file is a file used for simple inline conversions, such as translating ASCII to another format, such as EBCDIC. If an ILDATA file is required, it is created. If it is not, in step 424, FANOUT creates SUBAVL files subavl.000002-subavl.n, where n represents the number MTAs serving sets of intended recipients. Once these additional SUBAVL files are created, in step 426, FANOUT deletes the file subavl.000001.

In step 428, the newly created subavl.000002-subavl.n files are sent to their respective outbound MTAs 106. In step 430, if required, a subavl file is queued to an offline conversion process to create OLDATA files. OLDATA files are used for more complex conversions than ILDATA files. An example of a situation that would require an OLDATA file is when a spreadsheet created in the Lotus 1-2-3 format is converted to the Microsoft Excel format. In that situation, offline conversion would be required, and at least one OLDATA file would be created.

Figure 4C:
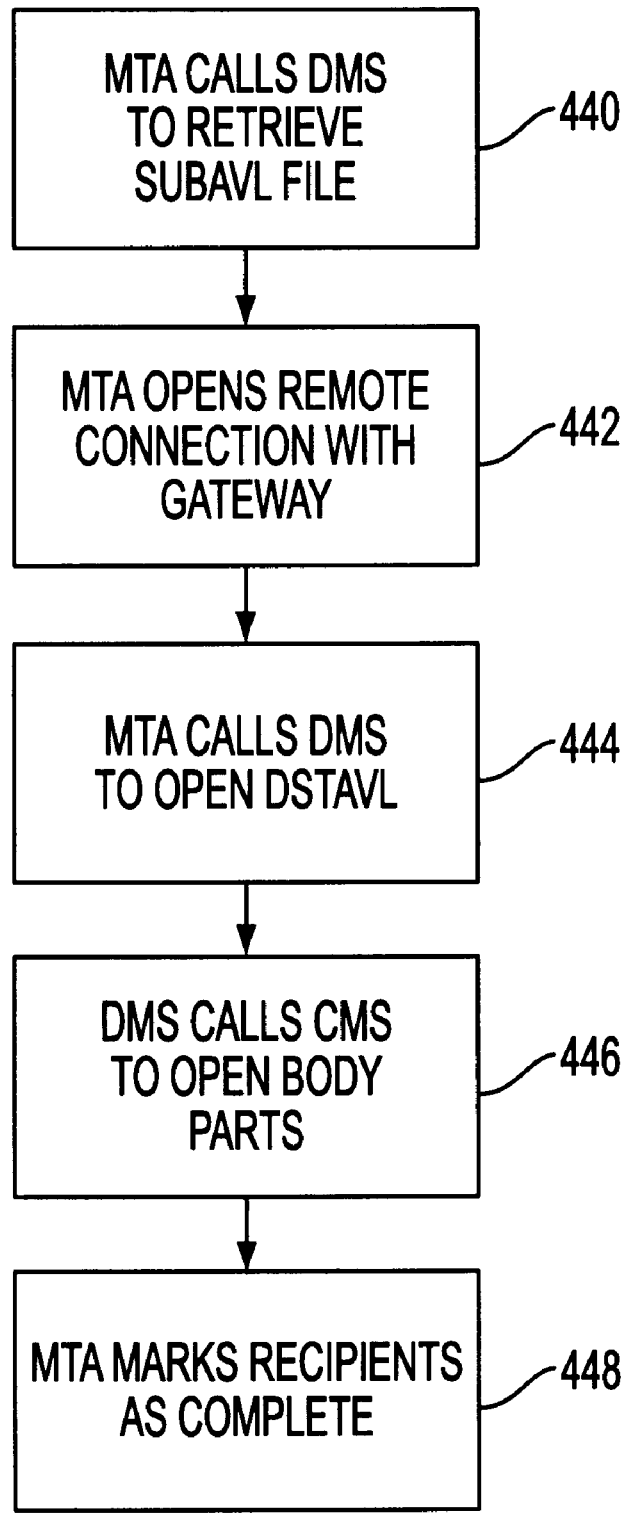
FIG. 4c is a flowchart illustrating the DMS processing of outbound information according to one embodiment of the invention.

Once an outbound MTA 106 receives a SUBAVL file, it invokes DMS 112 for outbound processing. Referring to FIG. 4c, which is a flowchart of outbound processing, in step 440, MTA 106 calls DMS 112 to retrieve the SUBAVL file. Next, in step 442, MTA 106 opens a remote connection with a gateway 108. In step 444, MTA 106 calls DMS 112 to open the DSTAVL file. In step 446, DMS 112 calls CMS 114 to open the body parts enumerated in the SUBAVL file and page them into memory. The SUBAVL file may refer to a body part directly, or it may refer to a body part in the DSTAVL file. In step 448, the MTA 106 calls DMS 112 to mark the recipients as completed and this information is written via the DMS 112 and CMS 114.

A single inbound distribution may result in the creation of many outbound SUBAVL files and body parts. The design of the system is such that all outbound processing will be performed in parallel when possible. This implies that the DSTAVL, PRDATA, ILDATA and OLDATA files will be simultaneously accessed by the outbound MTAs as often as possible. This parallel architecture is facilitated by the use of read-only data structures and files. Further, the in-memory copy of the DSTAVL file is stored in common read-only memory-mapped memory using procedures well known in the art. Thus each outbound MTA uses the exact same copy and only a single copy is present in memory, regardless of the number of concurrently running MTAs. Typical operating system disk caches are also used to reduce disk reads. In systems that have sufficient RAM it is possible for to receive and transmit messages without reading from the disk at any time. In this case the disk storage is being used for its intended purpose: to safe-store distributions for recovery in the event of a system failure or power outage. In the case of insufficient RAM the disk will be used as a physical extension of real memory using techniques well known in the art.

While the invention has been particularly shown and described by the foregoing detailed description, it will be understood by those skilled in the art that various other changes in form and detail may be made without departing from the spirit and scope of the invention.

What is claimed is:

1. A system of storage management for an electronic mail system comprising:
   a distribution management system for receiving information into memory as a distribution and for delivering said distribution from memory to a remote connection;
   a container management system for storing and retrieving said distribution from a storage medium; and
   wherein said distribution comprises at least one object and at least one attribute; said objects and attributes are related as a double-linked, parent-linked list.

2. The system of claim 1, wherein said distribution management system writes said received information to memory as a distribution in a hierarchial format.

3. The system of claim 1, wherein said distribution management system coagulates said distribution in memory, the result of said coagulation being a double-linked, parent-linked list in a linear format.

4. The system of claim 1, wherein said container management system writes said distribution to a storage medium as a plurality of files.

5. The system of claim 4, wherein said plurality of files comprises:
   a DSTAVL file;
   a first SUBAVL file;
   a PRDATA file for each of the body parts in the distribution.

6. The system of claim 5, wherein said plurality of files further comprises:
   at least one IODATA file; and
   at least one OLDATA file.

7. The system of claim 1, wherein said objects and attributes are further related using relative file offsets.

8. A method of storage management for an electronic mail system comprising:
   receiving information from a first remote connection;
   writing said information into memory as a distribution, said distribution having at least one object and at least one attribute, said objects and attributes are related as a double-linked, parent-linked list;
   storing said distribution to a storage medium as a plurality of files;
   retrieving at least one of said files from said storage medium; and
   delivering said distribution to at least a second remote connection.

9. The method of claim 8, wherein said step of writing information into memory as a distribution comprises:
   building an empty distribution in said memory; and
   filling said empty distribution in memory with an actual distribution.

10. The method of claim 8, wherein said step of storing said distribution to said storage medium comprises:
    selecting a directory to store said distribution;
    writing said distribution to said selected directory as a plurality of body parts; and
    removing said distribution from memory.

11. The method of claim 10, wherein said body parts are written as read-only files.

12. The method of claim 8, wherein said step of retrieving said at least one of said files from said storage medium comprises:
    opening at least one body part for said distribution; and
    paging said body part into memory.

13. The method of claim 8, wherein said step of delivering said distribution to a second remote connection comprises:
    establishing a contact with a remote connection;
    marking at least one recipient for said remote connection as complete.

14. The method of claim 8, wherein said objects and attributes are further related using relative file offsets.

15. A method of storage management for an electronic mail system comprising:
    receiving information from a first remote connection;
    writing said information into memory as a distribution having a hierarchial structure wherein said distribution comprises at least one object and at least one attribute; said objects and attributes are related as a double-linked, parent-linked list;
    coagulating said distribution in memory into a linear form;
    storing said distribution to a storage medium as a plurality of files;
    processing a first delivery view file;
    retrieving said distribution form said storage medium: and
    delivering said distribution to a second remote connection.

16. The method of claim 15, wherein said step of writing said information into memory as a distribution having a hierarchial structure comprises:
    creating an empty distribution in memory; and
    storing said information in said empty distribution in memory in a hierarchial structure.

17. The method of claim 15, wherein said step of storing said distribution to said storage medium a plurality of files comprises:
    storing said distribution at least one file as a double-linked, parent-linked list using relative file offsets;
    creating a first delivery view file; and
    storing a plurality of body parts for said distribution in a plurality of permanent data files.

18. The method of claim 15, wherein said step of processing a first delivery view file comprises:
    creating said first delivery view file;
    creating an inline data file responsive to an analysis of said first delivery view file;
    creating a separate delivery view file for each set of distinct intended recipients; and
    deleting said first delivery view file.

19. The method of claim 18, wherein said step of processing a first delivery view file further comprises:
    creating offline conversion files responsive to a determination that conversion is required.

20. The method of claim 15, wherein said step of retrieving said distribution from said storage medium comprises:

opening a plurality of body parts for said distribution; and paging said body parts into memory.

21. The method of claim 15, wherein said objects and attributes are further related using relative file offsets.

22. A computer usable medium having computer readable program code embodied therein for providing storage management for an electronic mail system on a computer system including a storage medium and memory; the computer readable program code in the computer usable medium comprising:

computer readable program code providing a distribution management system for processing inbound information, said distribution management system receiving said inbound information from a first remote connection and storing said inbound information in memory as a distribution; said distribution comprises a plurality of body parts wherein said body parts are related as a double-linked, parent-linked list; and a computer readable program code providing a container management system for storing and retrieving said distribution from a storage medium.

23. A system of storage management for an electronic mail system comprising:

means for processing inbound information, said processing means receiving said inbound information from a first remote connection and storing said inbound information in memory as a distribution comprising a plurality of body parts wherein said body parts are related as a double-linked, parent-linked list; and means for storing and retrieving said distribution from a storage medium.

\* \* \* \* \*